UNITED STATES PATENT OFFICE.

CHARLES R. MILKS, OF DETROIT, MICHIGAN.

IMPROVEMENT IN MASTIC ROOFING COMPOUNDS.

Specification forming part of Letters Patent No. 16,739, dated March 3, 1857.

*To all whom it may concern:*

Be it known that I, CHARLES R. MILKS, of Detroit, in the county of Wayne, in the State of Michigan, have invented a new and useful Improvement in Composition for all Roofing Purposes; and I do hereby declare that the following is a full and exact description thereof.

The nature of my invention consists in a certain composition for roofing, containing about double the quantity of rubber heretofore used, which, from long experience in the business, I have found absolutely necessary to prevent its cracking, and also the addition of several ingredients, some of which have not been used at all, and others heretofore used, but in greatly increased proportions, by me.

First I take twenty (20) gallons of naphtha or coal-tar; turn into a large kettle. Then I take as much asphaltum as can be dissolved in two (2) gallons purified spirits turpentine, (moderate heat,) as much gum-shellac as can be dissolved in two (2) gallons of strong alcohol, as much raw rubber as can be dissolved in two (2) gallons purified spirits of turpentine. Then pour the above-mixed ingredients into the kettle with the naphtha or coal-tar. Then add one and one-half (1½) gallons of linseed-oil boiled. I then subject the whole to a moderate heat, at the same time stirring in ten (10) pounds of pulverized soapstone, also five (5) pounds sugar of lead and one peck of plaster-of-paris. Then stir well and it is fit for use.

The method heretofore adopted in the mixture of ingredients for roofing purposes without heating all the ingredients is decidedly wrong, because the combining of them cannot be made perfect without heat. The addition of the asphaltum and an increased quantity of gum-shellac are highly necessary in order to make a more firm and compact body, while the increased quantity of rubber, together with the addition of soapstone, is indispensable to soften and make the whole elastic, and thereby prevent cracking, which I believe to be the fault of every composition for roofing now in use.

By using the articles here named in the proportions given and combining them thoroughly by subjecting them all to heat I am enabled to make a composition for all kinds of roofing which is exceedingly durable, not liable to crack, and yet a cheap composition.

I am aware that most, if not all, of the articles here named have been used in like compositions; and I am also aware that in some roof composition heat has been applied to the articles separately just before they have been put upon the roof.

What, therefore, I claim as of my invention, and desire to secure by Letters Patent, is—

The composition for roofing, made up of the ingredients, in the proportions, and in the manner herein set forth.

CHARLES R. MILKS.

Witnesses:
GEO. W. CHASE,
PHILIP S. COTTLE.